(12) United States Patent
Heuer et al.

(10) Patent No.: US 7,769,879 B2
(45) Date of Patent: Aug. 3, 2010

(54) METHOD FOR GENERATING AND/OR PROCESSING A DATA STREAM DESCRIPTION

(75) Inventors: Jörg Heuer, Oberhaching (DE);
Andreas Hutter, München (DE);
Gabriel Panis, Lemesos (CY);
Christian Timmerer, Klagenfurt (AT)

(73) Assignee: Siemens Aktiengesellschaft, Munich (DE)

( * ) Notice: Subject to any disclaimer, the term of this patent is extended or adjusted under 35 U.S.C. 154(b) by 812 days.

(21) Appl. No.: 10/580,801

(22) PCT Filed: Oct. 26, 2004

(86) PCT No.: PCT/EP2004/052663

§ 371 (c)(1),
(2), (4) Date: Mar. 13, 2007

(87) PCT Pub. No.: WO2005/053315

PCT Pub. Date: Jun. 9, 2005

(65) Prior Publication Data

US 2007/0143494 A1      Jun. 21, 2007

(30) Foreign Application Priority Data

Nov. 28, 2003   (DE)   ................. 103 55 608

(51) Int. Cl.
*G06F 13/00*   (2006.01)
(52) U.S. Cl. .............. 709/231; 709/225; 709/250
(58) Field of Classification Search ................ 709/217, 709/219, 223, 224, 227, 228, 230, 231, 250
See application file for complete search history.

(56) References Cited

U.S. PATENT DOCUMENTS

| | | | |
|---|---|---|---|
| 6,546,421 B1 * | 4/2003 | Wynblatt et al. | 709/225 |
| 7,251,277 B2 * | 7/2007 | Luken | 375/240.08 |
| 2002/0138517 A1 | 9/2002 | Mory et al. | |
| 2005/0287948 A1 * | 12/2005 | Hellwagner et al. | 455/3.01 |

FOREIGN PATENT DOCUMENTS

| | | |
|---|---|---|
| WO | WO 03/001811 A1 | 1/2003 |
| WO | WO 03/091905 A2 | 11/2003 |

OTHER PUBLICATIONS

Heuer Jörg et al., "Multimedia Messaging Technologien auf der Basis von MPEG-7", Elektronische Medien: Technologien, Systeme, Anwendungen, ITG-Fachbericht 167, pp. 157-162; 2001.

(Continued)

*Primary Examiner*—Viet Vu

(57) ABSTRACT

This invention relates to a method for producing and/or processing a data stream description. According to said method, the data stream description is used to write and/or reference and/or classify sections of a data stream and the data stream description can be transformed by means of a processor using a transformation, the transformed data stream description allowing an adaptation of the data stream. The inventive method is characterized in that one or more sections of a data stream description are marked as processing units, a processing unit containing all information from the data stream description that is required for the transformation of the processing unit by means of the processor into a transformed processing unit. An access to sections of the data stream description outside the processing unit is not required for transformation.

13 Claims, 1 Drawing Sheet

OTHER PUBLICATIONS

Myriam Amielh, Silvain Devillers, "Bitstream Syntax Description Language: Apllication of XML—Schema to Multimedia Content Adaptation", The 11th International World Wide Web Conference, USA, May 8, 2002, pp. 1-14, Section 3.1, 3.3-3.5.5.

Gabriel Panis, Andreas Hutter, Jörg Heuer, Hermann Hellwagner, Harald Kosch, Christian Timmerer, Sylvain Devillers, Myriam Amielh; "Bitstream Syntax Description: a Tool for Multimedia Resource Adaptation Within MPEG-21"; Signal Processing: Image Communication 18; 2003; pp. 721-747; Elsevier B.V.

Anthony Vetro, Christian Timmerer and Sylvain Devillers (Editors); "Study of ISO/IEC 21000-7 FCD—Part 7: Digital Item Adaptation"; ISO/IEC JTC 1/SC 29/WG 11/N5933; 7.4.3 BS Description Generation: BSDL-2; Oct. 2003; pp. 1-10; Brisbane, Australia.

Anthony Vetro, Christian Timmerer and Sylvain Devillers (Editors); "Study of ISO/IEC 21000-7 FCD—Part 7: Digital Item Adaptation"; ISO/IEC JTC 1/SC 29/WG 11/N5933; 7.4.4 Generic Bitstream Syntax Schema (gBS Schema); Oct. 2003; pp. 1-11; Brisbane, Australia.

Anthony Vetro, Christian Timmerer and Sylvain Devillers (Editors); "Study of ISO/IEC 21000-7 FCD—Part 7: Digital Item Adaptation"; ISO/IEC JTC 1/SC 29/WG 11/N5933; 7.7 Bitstream Syntax Description Transformation Instructions; Oct. 2003; pp. 1-21; Brisbane, Australia.

David C. Fallside (Editor); "XML Schema Part 0: Primer"; W3C Recommendation; May 2, 2001; pp. 1-74; [Retrieved from Internet at] http://www.w3.org/TR/2001/REC-xmlschema-0-20010502; [Retrieved from Internet on] May 22, 2006.

Henry S. Thompson, David Beech, Murray Maloney, Noah Mendelsohn (Editors); "XML Schema Part 1: Structures"; W3C Recommendation; May 2, 2001; pp. 1-203; [Retrieved from Internet at] http://www.w3.org/TR/2001/REC-xmlschema-1-20010502; [Retrieved from Internet on] May 22, 2006.

Paul V. Biron, Ashok Malhotra (Editors); "XML Schema Part 2: Datatypes"; W3C Recommendation; May 2, 2001; pp. 1-146; [Retrieved from Internet at] http://www.w3.org/TR/2001/REC-xmlschema-2-20010502; [Retrieved from Internet on] May 22, 2006.

\* cited by examiner

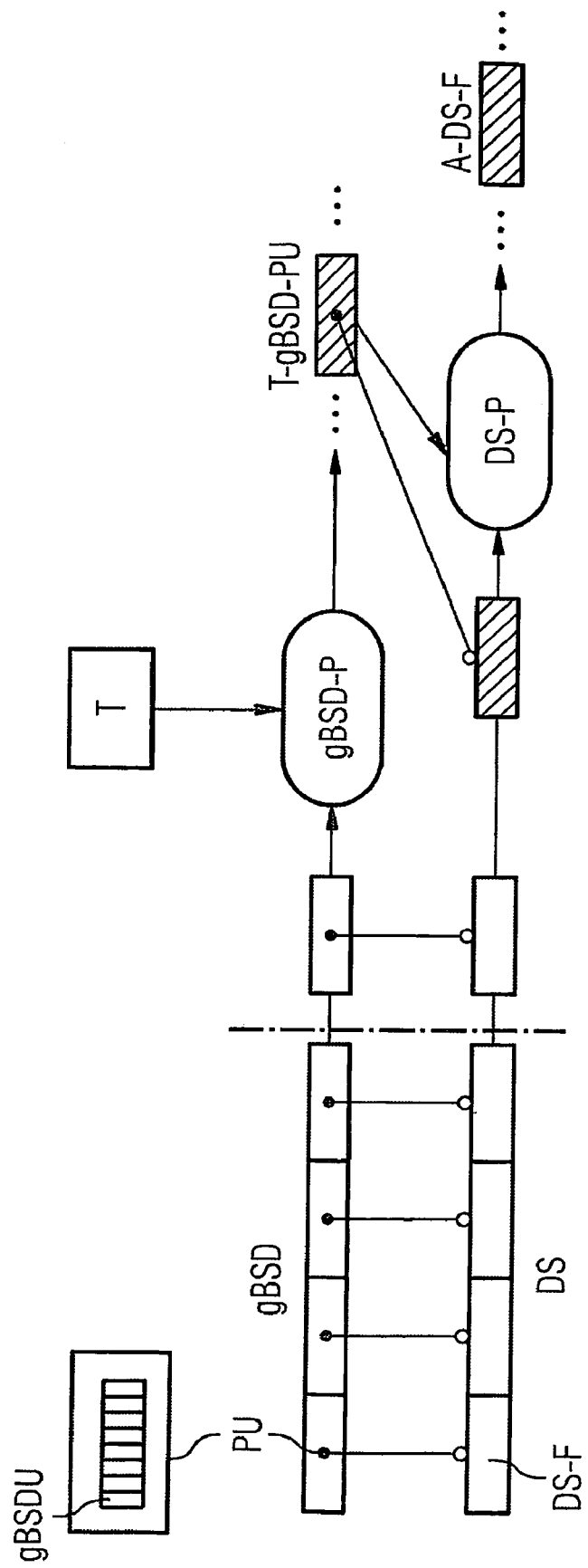

METHOD FOR GENERATING AND/OR PROCESSING A DATA STREAM DESCRIPTION

CROSS REFERENCE TO RELATED APPLICATIONS

This application is the US National Stage of International Application No. PCT/EP2004/052663, filed Oct. 26, 2004 and claims the benefit thereof. The International Application claims the benefits of German application No. 10355608.7 filed Nov. 28, 2003, both of the applications are incorporated by reference herein in their entirety.

FIELD OF THE INVENTION

The invention relates to a method and device for generating and/or processing a data stream description, in particular an XML-based data stream description.

BACKGROUND OF THE INVENTION

XML (=Extensible Markup Language) is a language, which allows a structured description of the content of a document using XML schema language definitions. A more precise description of the XML schema language definition and the definition of XML structures, data types and content models this allows can be found in the references [1], [2] and [3].

The use of XML-based descriptions of data streams, in which the individual components of the data stream are described or identified according to their syntactic significance using BSD (Bitstream Syntax Description; see reference [4]), freely addressable gBSD (generic Bitstream Description; see reference [5]) units or in respect of adaptation possibilities, is known from the prior art (see reference [6]). These descriptions of the data stream are used to adapt the data stream by means of a generic processor with no knowledge of the data stream format. To this end the description of the data stream can first be transformed in an appropriate manner, with the data stream then being adapted based on the transformed description.

In the case of the descriptions of data streams known from the prior art, the generic processor must read the complete description for a transformation of the data stream description or an adaptation of the data stream, in order to determine the necessary adaptations in the data stream description or in the data-stream. This is disadvantageous, as enough memory has to be made available for this in the generic processor and at the start of the adaptation it is necessary to wait until the processor has received the complete description of the data stream. This is a fundamental problem in the case of broadcast services, for example digital television, in particular.

SUMMARY OF THE INVENTION

The object of the present invention is therefore to create a method for the generation and successive processing of a data stream description, with which the data stream description generated with the method allows a simple and efficient adaptation of the data stream, on which the data stream description is based, by means of a generic processor.

This object is achieved by means of the independent claims. Developments of the invention are defined in the dependent claims.

A data stream description is generated and/or processed with the claimed method, said data stream description being used to describe and/or reference and/or classify sections of a data stream and being able to be transformed by means of a processor using a transformation, with the transformed data stream description allowing an adaptation of the data stream. It should be noted here that, for the purpose of adapting the data stream, the transformation of the data stream description does not have to be executed in a separate method step but can be an implicit part of the adaptation of the data stream. The method is characterized in that one or more sections of the data stream description are identified as process units, a process unit containing all the information from the data stream description that is required for the transformation of the process unit by means of the processor to a transformed process unit, without sections of the data stream description outside the process unit having to be accessed during the transformation of the process unit. The data stream description is preferably an XML-based data stream description, which in particular contains gBSD and/or BSD units.

The claimed method has the advantage that individual process units and the corresponding sections of the data stream can be read and processed separately in a processor for the purpose of transforming data stream descriptions and adapting data streams. As a result the processor requires less memory capacity for the transformation or adaptation and can process the data stream descriptions more quickly, as it has to search through less memory to access information. Also the successive adaptation of a data stream in small process units in a small memory only requires a short delay. This is particularly important for broadcast and streaming applications.

In a preferred embodiment of the invention at least one process unit comprises two or more parts, which are not successive in a data stream description. Non-successive sections of a data stream can also be described by a process unit.

In a further embodiment at least one sub-area of at least one process unit is identified as a persistent sub-area, containing information, which can be used during the transformation of process units following the at least one process unit. A sub-area of at least one process unit can also be identified as a persistent sub-area, if it describes information from the data stream, which can be used during the adaptation of sections of the data stream, which are described by process units following the at least one process unit. A sub-area of a data stream description or a section of a data stream is thus defined, which is required permanently by the processor during the transformation of the data stream description or adaptation of the data stream. It can also be signaled in the claimed method how long the persistent sub-areas thus described of the process unit and/or the sections of the data stream, which are described by the sub-areas, are to be stored in a storage unit of the processor for the transformation of the data stream description and/or adaptation of the data stream. It can also be signaled that a persistent sub-area of a process unit stored in a memory of a processor should be deleted.

In a further embodiment the maximum memory capacity of the process units and/or the sections of the data stream described by the process units is signaled. As a result the processor can optionally verify whether there is sufficient memory, before processing the data stream description and/or the described data stream. If not, another processor can carry out the processing operation.

The identifications and signalings carried out in the claimed method are preferably stored in a separate data stream and/or in the data stream description.

In addition to the described method, the invention also comprises a device, which is configured such that it can be used to implement the claimed method. The device is hereby in particular part of a device for transforming a data stream description and/or adapting a data stream.

BRIEF DESCRIPTION OF THE DRAWINGS

Exemplary embodiments of the invention are described below with reference to the accompanying drawing, in which:

FIG. 1 shows a schematic diagram of a claimed method for the generation and successive processing of a data stream description.

DETAILED DESCRIPTION OF THE INVENTION

FIG. 1 shows a data stream DS in the form of a bitstream, comprising a plurality of smaller sections DS-F. FIG. 1 also shows a corresponding data stream description gBSD, which describes the structure of the data stream DS and is based on the generic Bitstream Description (see reference [5]) already mentioned at the start of the description. The gBSD data stream description is also a bitstream, comprising a plurality of gBSD units (see reference [5]). According to the embodiment of the claimed method shown here, individual process units PU of the data stream description gBSD are identified, with the process units in turn comprising a number of gBSD units gBSDU. The individual process units PU comprise selected descriptions of parts of the data stream DS, with the selected descriptions being combined to form process units PU such that the process units can be processed separately for a subsequent transformation T of the data stream description, without sections of the data stream description outside the process unit having to be accessed during the transformation.

In FIG. 1 a processor carrying out a transformation T of the data stream description is marked gBSD-P. As a result the processor gBSD-P supplies a transformed data stream description, which comprises individual transformed process units T-gBSD-PU. As mentioned above, the processor can hereby process the process units individually for the purpose of transformation, whereas according to the prior art the complete data stream description has to be read. The processor gBSD-P therefore requires a smaller memory and does not have to have received the complete stream for processing purposes. The individual transformed process units T-gBSD-PU then serve to carry out an adaptation of the data stream based on the transformed process units in a processor DS-P. As a result of the adaptation, the processor DS-P finally supplies individual adapted sections A-DS-F of the data stream.

BIBLIOGRAPHY

[1] http://www.w3.org/TR/2001/REC-xmlschema-0-20010502/
[2] http://www.w3.org/TR/2001/REC-xmlschema-1-20010502/
[3] http://www.w3.org/TR/2001/REC-xmlschema-2-20010502/
[4] "7.4.3 BS Description generation: BSDL-2", p. 125, ISO/IEC JTC 1/SC 29/WG 11/N5933, "Study on ISO/WEC 21000-7: Digital Item Adaptation", Brisbane, October 2003
[5] "7.4.4 generic Bitstream Syntax Schema (gBS Schema)", p. 133, ISO/IEC JTC 1/SC 29JWG 11/N5933, "Study on ISO/IEC 21000-7: Digital Item Adaptation", Brisbane, October 2003
[6] "7.7 Bitstream Syntax Description Transformation Instructions", p. 151, ISO/IEC JTC 1/SC 29/WG 11/N5933, "Study on ISO/IEC 21000-7: Digital Item Adaptation", Brisbane, October 2003

The invention claimed is:

1. A method for processing a data stream description of the type used to describe, reference or classify sections of a data stream, comprising:
providing a first single data stream comprising a plurality of smaller sections and having a predetermined structure;
providing, as a second single data stream, a data stream description of the first single data stream, which description describes the structure of the first single data stream wherein the data stream description is formed as multiple process units, wherein a first of the process units contains sufficient information from the data stream description that is required for a transformation of the first process unit by a processor without accessing information in another one of the process units of the data stream description, and a second one of the process units contains information from the data stream description that is required for a transformation of the second process unit by a processor without requiring information in another one of the process units of the data stream description;
providing a processor;
applying the data stream description to the processor to provide a transformation of the first process unit with the processor without accessing information in any of the other process units, and to provide a transformation of the second process unit with the processor without accessing information in any of the other process units; and
performing an adaptation of a first of the smaller sections of the first single data stream with the transformation of the first process unit.

2. The method as claimed in claim 1, wherein the data stream description is an XML-based data stream description.

3. The method as claimed in claim 2, wherein the data stream description contains BSD or gBSD units.

4. The method as claimed in claim 1, wherein the first process unit comprises a plurality of parts which are not successive in the data stream description and describes a plurality of non-successive sections of the data stream.

5. The method as claimed in claim 1, wherein a sub-area of the first process unit is identified as a persistent sub-area, the persistent sub-area containing information that is used for a transformation of a remaining process unit following the first process unit.

6. The method as claimed in claim 5, wherein a duration of storing the persistent sub-area of the process unit which is stored in a memory of a processor and a deletion of the persistent sub-area are signaled.

7. The method as claimed in claim 5,
wherein a duration of storing a section of the data stream described by the persistent sub-area of the process unit is signaled,
wherein the section of the data stream described by the persistent sub-area of the process unit is stored in a memory of a second processor.

8. The method as claimed in claim 1, wherein a sub-area of the first process unit is identified as a persistent sub-area, the persistent sub-area describing information from the data stream that is used for an adaptation of a remaining section of the data stream described by a corresponding process unit following the first process unit.

9. The method as claimed in claim 8, wherein a duration of storing the persistent sub-area of the first process unit which is stored in a memory of the processor and a deletion of the persistent sub-area are signaled.

10. The method as claimed in claim 8,
wherein a duration of storing a section of the data stream described by the persistent sub-area of the first process unit is signaled,
wherein the section of the data stream described by the persistent sub-area of the process unit is stored in a memory of the processor.

11. The method as claimed in claim 1, wherein a maximum memory capacity of the first process unit or a section of the data stream described by the first process unit is signaled.

12. The method as claimed in claim 1, wherein the identification and signaling are stored in a separate data stream or in the data stream description.

13. The method as claimed in claim 1, wherein the method also generates the data stream description.

* * * * *